United States Patent
Ott

(10) Patent No.: US 7,098,769 B2
(45) Date of Patent: Aug. 29, 2006

(54) IDENTIFICATION SYSTEM FOR VERIFYING AN AUTHORIZATION TO ACCESS AN OBJECT OR TO USE AN OBJECT, PARTICULARLY A MOTOR VEHICLE

(75) Inventor: Albert Ott, Wiesbaden-Auringen (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 10/609,782

(22) Filed: Jun. 30, 2003

(65) Prior Publication Data

US 2004/0000986 A1    Jan. 1, 2004

Related U.S. Application Data

(63) Continuation of application No. PCT/EP01/13638, filed on Nov. 22, 2001.

(30) Foreign Application Priority Data

Dec. 29, 2000    (EP)    ................... 00128704

(51) Int. Cl.
    *H04Q 9/00*    (2006.01)
(52) U.S. Cl. ................... 340/5.61; 340/10.4
(58) Field of Classification Search .............. 340/10.3, 340/10.4, 426.35, 10.1, 825.58, 10.41; 342/129, 342/131, 111, 112, 128, 125, 196, 357.08
    See application file for complete search history.

(56) References Cited

U.S. PATENT DOCUMENTS

| | | | | |
|---|---|---|---|---|
| 4,315,260 A | | 2/1982 | Küpfer | ................. 343/7.5 |
| 4,804,961 A | | 2/1989 | Hane | ................. 342/125 |
| 5,982,322 A | * | 11/1999 | Bickley et al. | ........ 342/357.08 |
| 6,023,238 A | * | 2/2000 | Cornic et al. | ............... 342/129 |
| 6,208,239 B1 | * | 3/2001 | Muller et al. | .......... 340/426.35 |

FOREIGN PATENT DOCUMENTS

| | | |
|---|---|---|
| DE | 198 39 695 C1 | 5/2000 |
| DE | 199 26 234 A1 | 12/2000 |
| EP | 0 694 887 A1 | 7/1995 |
| EP | 1 033 585 A2 | 2/2000 |
| EP | 1 061 211 A1 | 6/2000 |
| FR | 2 716 850 A1 | 3/1994 |
| WO | WO 00/68536 | 11/2000 |

* cited by examiner

*Primary Examiner*—Wendy R. Garber
*Assistant Examiner*—William Bangachon
(74) *Attorney, Agent, or Firm*—Baker Botts L.L.P.

(57) ABSTRACT

An identification system is disclosed in which an interrogation signal is emitted on the side of the object, the signal having a carrier frequency which is modified in sections. A mobile encoder (20) encodes the interrogation signal and produces a response signal which is sent back to the object (10). The response signal is mixed with the interrogation signal and decoded in an evaluation unit (14–16) on the side of the object. The distance (d) between the encoder (20) and the object (10) is then determined by means of Fourier transformation (16).

14 Claims, 6 Drawing Sheets

IDENTIFICATION SYSTEM FOR VERIFYING AN AUTHORIZATION TO ACCESS AN OBJECT OR TO USE AN OBJECT, PARTICULARLY A MOTOR VEHICLE

CROSS REFERENCE TO RELATED APPLICATION

This application is a continuation of copending International Application No. PCT/EP01/13638 filed Nov. 22, 2001 which designates the United States, and claims priority to European application number 00128704.4 filed Dec. 29, 2000.

TECHNICAL FIELD OF THE INVENTION

The invention relates to an identification system for verifying an authorization to access an object or to use an object, particularly a motor vehicle.

BACKGROUND OF THE INVENTION

Radio-based identification systems, also referred to as RFID ("radio frequency identification") systems, are increasingly being used, for example, as a replacement for mechanical key systems, for access control for computers or for such things as automatic payment systems. An RFID system consists of an identification marker (referred to in the following as an encoder), which is also called an electronic key, RFID tag, ID transmitter or ID card, which the user carries about his/her person or which is disposed on an object that is to be identified. The encoder is equipped with a characteristic code (code information). This code is interrogated via a basestation (referred to in the following as a send and receive unit) and subsequently authenticated or verified.

Various radio-based transmission technologies are possible or usual: LF systems in the frequency range from 100 to 300 kHz, RF systems at 433 MHz or 867 MHz and high-frequency microwave systems which mostly operate at frequencies of 2.4 GHz, 5.8 GHz, 9.5 GHz or 24 GHz.

With encoders, a distinction is made between active and passive identification. Passive identification is characterized in that the encoder can constantly be interrogated by the send and receive unit without the need for intervention by the user. If the encoder is located within a certain distance range of the send and receive unit, the identification is performed automatically or, for example in the case of manual actuation of a switching device, by the user, e.g. by operating a door handle. The restriction on the distance range is generally a result of the radio link hop attenuation.

With an active identification system, on the other hand, the communication is actively initiated by the user on the encoder. In this case the user usually must therefore operate the encoder manually first and then, for example, additionally operate the door handle. For reasons of greater convenience, therefore, passive identification systems are increasingly being used.

A typical and favorable type of encoder are so-called backscatter encoders (DE 198 39 696 C2). With these, a send and receive unit transmits a send signal (referred to in the following as an interrogation signal) with a linearly frequency-modulated carrier wave in the direction of the encoder. If the encoder receives the interrogation signal, the signal is reflected in modulated form, but is not evaluated internally any further in the encoder.

In the basestation, interrogation signal and response signal are evaluated firstly with regard to agreement of the received code information with the expected code information and secondly with regard to a frequency offset (frequency difference) between send and receive frequency. The frequency offset in time corresponds to a traveled radio link (signal propagation time). If the frequency difference lies within a predefined interval, the encoder is regarded as authorized and the desired function is initiated in the object.

A disadvantage with identification systems of this type is that the transmission channel can be tapped unnoticed and in theory at any time. By means of a suitable device it is therefore normally possible for an attacker to gain unauthorized access to the code and thereby overcome the protection function actually intended.

With the known identification systems, an unauthorized person can place a "mirror" in proximity to the object so that the interrogation signal is reflected. Since an authorized encoder is recognized on account of a small frequency difference and an encoder is simulated in the vicinity of the object, the protection function is simply overcome.

SUMMARY OF THE INVENTION

The object of the invention is to create an identification system which exhibits improved security against unauthorized use or unauthorized access.

The object can be achieved by an identification system for verifying an authorization to access an object or to use an object, particularly a motor vehicle, comprising a send and receive unit disposed on the object side which transmits an interrogation signal with section-wise modified carrier frequency in modulated form according to a sequence, a mobile encoder which generates a response signal by sending back the received sequence in encrypted and modulated form, and an evaluation unit on the object side which decrypts the response signal and compares it with the interrogation signal with regard to a frequency offset and which determines the distance between encoder and object as a function of the result of the comparison.

The evaluation unit can be supplied with a mixed signal composed of interrogation signal and response signal and a hybrid product resulting in the process can be evaluated with regard to distance. The mobile encoder may comprise a memory in which the sequence of section-wise modified carrier frequencies is buffered and with the aid of which the response signal is encrypted. The evaluation unit may comprises a decryption unit which decrypts the received response signal with regard to the sequence of the section-wise modified carrier frequencies, and a decoding unit which mixes the response signal with the interrogation signal and evaluates it with regard to the propagation time difference between the two and therefore the distance between encoder and object. The interrogation signal can be transmitted as a broadband signal modulated with section-wise modified carrier frequencies in the frequency range greater than 100 MHz. The evaluation unit comprises a Fourier transformer with the aid of which the distance is determined.

The object can also be achieved by an Identification system for verifying an authorization to access an object or to use an object, in particular a motor vehicle, comprising a send and receive unit disposed on the object side which transmits a first interrogation signal with section-wise modified carrier frequency according to a sequence and a second interrogation signal in modulated form at a different carrier frequency, a mobile encoder which correlates the first and the second interrogation signal and sends back a response signal, and an evaluation unit on the object side which compares the response signal together with an encoded reference signal with regard to a frequency offset and determines the distance between encoder and object as a function of the result of the comparison.

Furthermore, the object can be achieved by a method for verifying an authorization to access an object or to use an object, particularly a motor vehicle, comprising the steps of:
- transmitting an interrogation signal with section-wise modified carrier frequency in modulated form according to a sequence,
- generating a response signal by sending back the received sequence in encrypted and modulated form, and
- decrypting the response signal and comparing it with the interrogation signal with regard to a frequency offset and determining the distance between encoder and object as a function of the result of the comparison.

The method may further comprise the step of providing a mixed signal composed of interrogation signal and response signal and evaluating a hybrid product resulting in the process with regard to distance. The method may further comprise the step of buffering the sequence of section-wise modified carrier frequencies and encrypting the response signal with the aid of said sequence. The method may further comprise the steps of:—decrypting the received response signal with regard to the sequence of the section-wise modified carrier frequencies,—mixing the response signal with the interrogation signal, and—evaluating the response signal with regard to the propagation time difference between the two and therefore the distance between encoder and object. The method may further comprise the step of transmitting the interrogation signal as a broadband signal modulated with section-wise modified carrier frequencies in the frequency range greater than 100 MHz. The method may further comprise the step of determining the distance by performing a Fourier transformation.

The object can also be achieved by a method for verifying an authorization to access an object or to use an object, in particular a motor vehicle, comprising the steps:
- transmitting a first interrogation signal with section-wise modified carrier frequency according to a sequence and a second interrogation signal in modulated form at a different carrier frequency,
- correlating the first and the second interrogation signal and sending back a response signal, and
- comparing the response signal together with an encoded reference signal with regard to a frequency offset and determining the distance between encoder and object as a function of the result of the comparison.

In this system, a frequency-modulated interrogation signal is transmitted in stages. A mobile encoder does not reflect the interrogation signal immediately, but modifies a sequence which reflects the sequence of the reception of the frequency stages and sends this back phase-locked in each case as a response signal. In the basestation the response signal is modified inversely compared with previously and only then compared with the interrogation signal. The distance between encoder and object is determined from the comparison signal. The interrogation signal is accepted and appropriate functions are then executed in the object only provided the encoder is located within a predefined distance from the object.

In this way a dual form of security is provided in which not only the coding of the response signal but also the distance of the encoder from the object must correspond to predefined values, even if the coding itself is not checked for authorization. This has the advantage that this so-called question-answer dialog between object and encoder can proceed quickly and yet adequate protection against impersonators is ensured.

BRIEF DESCRIPTION OF THE DRAWINGS

Exemplary embodiments of the invention are explained in more detail below with reference to the schematic drawings, in which.

DETAILED DESCRIPTION OF THE PREFERRED EMBODIMENTS

Figure 1:
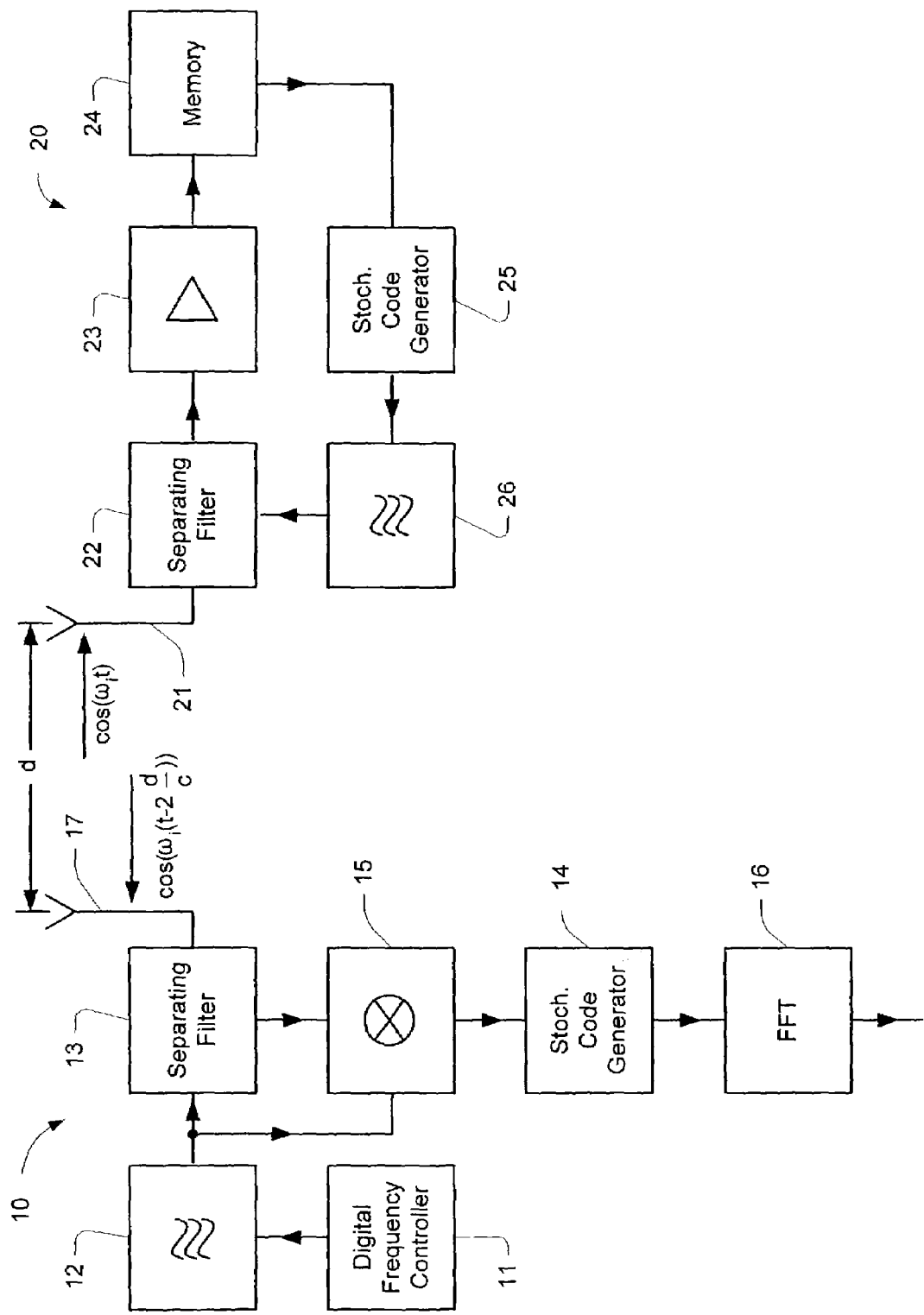
FIG. 1 shows a block diagram of an identification system according to the invention.
Figure 6:
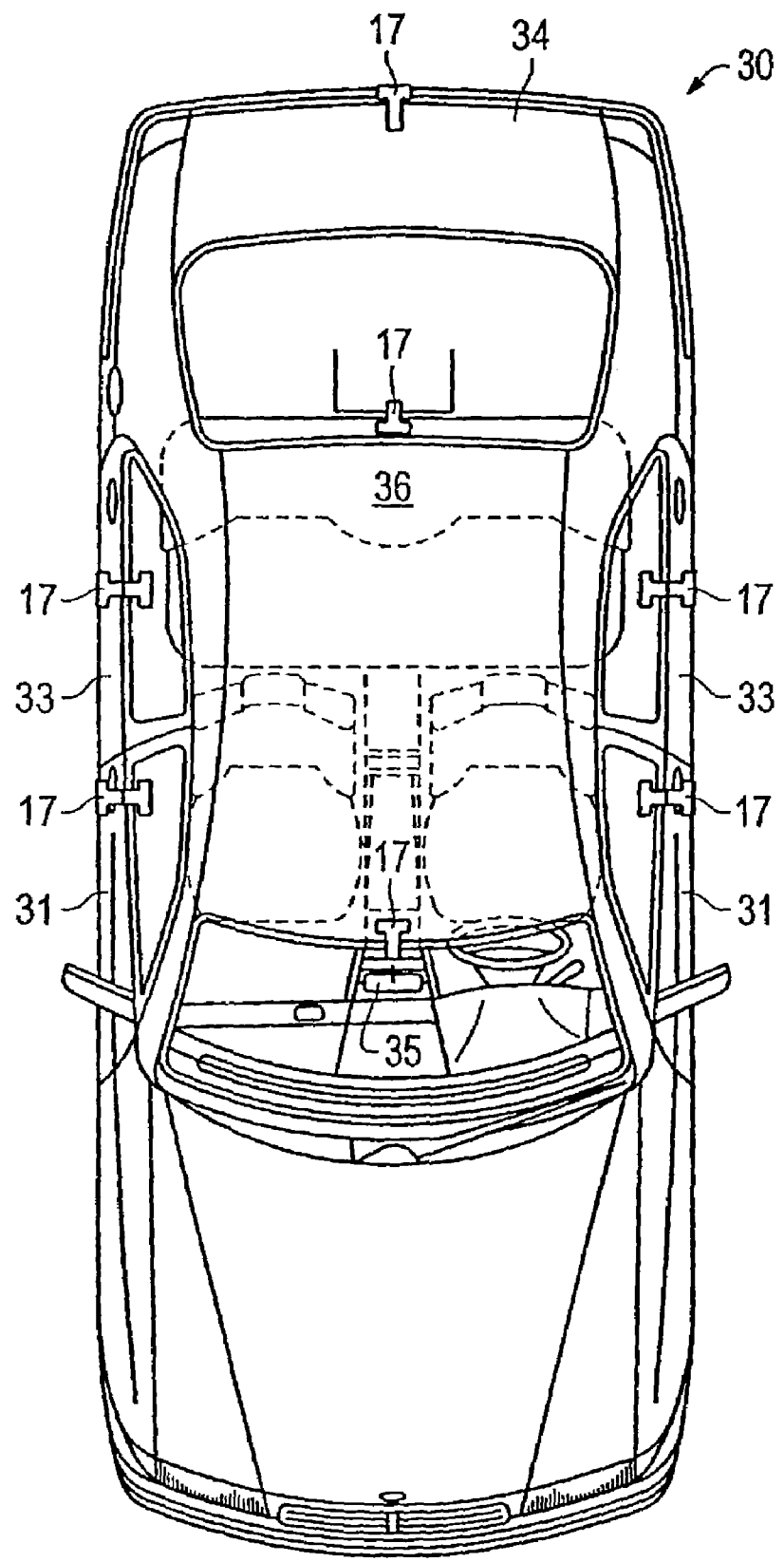
FIG. 6 shows an identification system according to the invention which is disposed in a motor vehicle.

An identification system comprises a basestation 10 (FIG. 1) having a send and receive unit 17 which is disposed in an object (the special object "motor vehicle" is explained in more detail in FIG. 6). The identification system further comprises a mobile, portable encoder 20 which verifies an authorization to access or use the object with the aid of the transmission of a response signal.

In addition to the send and receive unit 17 with its send and receive antenna, the basestation 10 comprises a digital frequency controller 11 which controls the output signal and frequency of a signal generator 12. Via a send and receive separating filter 13 (send and receive path are separated from each other) the output signal from generator 12 is supplied to the antenna.

The signals received via the antenna are supplied via the separating filter 13 to a mixer 15, to which the output signal from the generator 12 is supplied as a comparison or reference signal. The output signal from the mixer 15 is also supplied to a decryption unit (implemented, for example, as a stochastic code generator 14) in which an encryption performed in the encoder 20 is "reversed" by applying an inverse encryption to the signal.

The decrypted signal is supplied via an A/D converter (not shown) to a Fourier transformer 16, by means of which the sampling values of the A/D converter are Fourier-transformed in accordance with a specified rule. The output signal of the Fourier transformer 16 is evaluated with regard to a frequency offset or difference between generator signal and response signal and consequently with regard to a signal propagation time of the interrogation signal and the response signal and therefore also an encoder—object distance. Thus, mixer 15, code generator 14 and Fourier transformer 16 act like an evaluation unit (or decoding unit) which decodes the received response signal and evaluate it with regard to distance d.

If the encoder 20 is within range of the interrogation signal, it receives the interrogation signal via an antenna 21 and forwards it via a separating filter 22 to a demodulator/amplifier 23. The amplifier 23 routes the demodulated interrogation signal to a memory 24, in which the signal is buffered. An encryption unit (a stochastic generator 25 for example) performs an encryption with the aid of a mathematical algorithm and the buffered values and uses this to control a signal generator 26. In this way the received interrogation signal is modified in a predefined manner.

The signal generator 26 comprises a PLL circuit which ensures that the generated signal is phase-locked with respect to the received interrogation signal (PLL synchronizes the phase of the response signal with the interrogation signal). This has the advantage that no distortion of the signal propagation time between basestation 10 and encoder 20 is produced as a result of the signal processing on the encoder 20.

The signal encrypted or decrypted in this way is supplied as a response signal via the separating filter 22 to the antenna 21 and transmitted via this. The response signal then represents itself in such a way as though it had been reflected by the encoder 20 and at the same time modified in terms of its coding.

Figure 2:
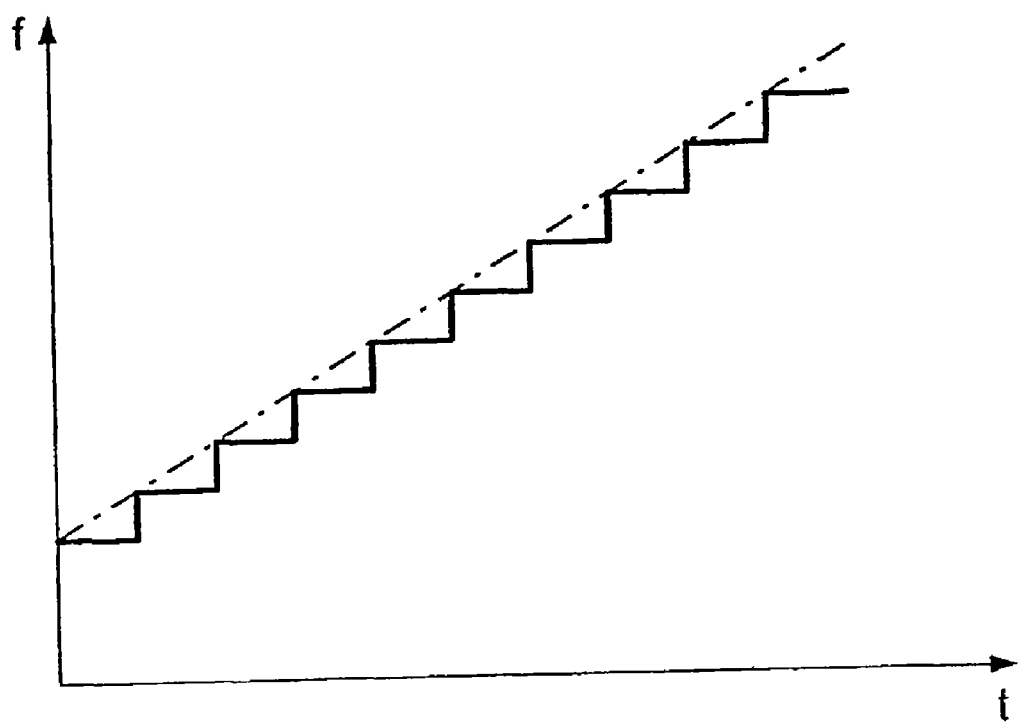
FIG. 2 shows an interrogation signal of the identification system as shown in FIG. 1.

The basestation 10 transmits as necessary or continuously a frequency-modified interrogation signal in sections according to a predefined sequence, as shown for example in FIG. 2, and then waits to receive a response signal on the basis of which the authorization of the encoder 20 is verified (this is also referred to as authentication).

In this context a section-wise frequency-modified signal (in the exemplary embodiment shown in FIG. 2 the signal rises in a stair-step shape) means that the generator generates an oscillator frequency which remains constant for a short time period (sections) and then abruptly changes its frequency for a further time period (in the exemplary embodiment a stair-step signal is produced). The frequency is modified repeatedly within a frequency band according to a predefined sequence or a specific algorithm.

The sequence of the generated step carrier frequencies may be such that—as shown in FIG. 2—a linearly rising envelope (represented by a dashed line in FIG. 2) is produced. Higher and higher frequencies are generated in stages/sections in succession. This contrasts with typical FMCW (Frequency Modulated Continuous Wave) modulation in which the send frequency is modified linearly and continuously.

The sequence may also be such that a non-linear envelope, for example a logarithmic curve, is produced which is then modulated or demodulated at the respective carrier frequency which ensues. The frequencies used are usually in excess of 100 MHz. The signals are typically transmitted within a predefined bandwidth in the frequency ranges 433 MHz, 868 MHz or 2.4 GHz. Also, the generated frequencies may only ever lie within the frequency bands approved in the particular countries in order to ensure that there are no infringements of national or regional telecommunications regulations and approved frequency bands.

If a mobile encoder 20 is disposed within the range of influence of the send and receive unit (i.e. within the range of the interrogation signal) and it receives an interrogation signal, then it independently modifies (also referred to as encrypts or encodes) the sent and received sequence and sends back a response signal with the modified sequence.

The encryption unit (stochastic code generator 12) ensures that the sequence of carrier frequencies received by the encoder 20 is modified and the signal is quasi-reflected, and in fact in accordance with a stochastic algorithm, as is performed inversely on the object side. The encoder 20 has a characteristic encryption algorithm of its own, by means of which the sequence is encoded. All encoders 20 assigned to the object should have the same algorithm so that each encoder 20 can verify its authorization.

In the basestation 10 the same algorithm is inversely applied to the response signal in order to obtain the original sequence once more. In this way the decrypted response signal can then be compared (mixed) with the sent interrogation signal in order to determine a frequency offset and therefore signal propagation time between encoder 20 and object.

A frequency offset between the two corresponds to a signal propagation time between basestation 10 and encoder 20 and back. The basestation 10—encoder 20 distance can be determined directly from the propagation time or frequency offset. The response signal is accepted only if the distance is less than a predefined value. The authorization of the encoder 20 is thus verified in order to obtain authorized access to an object or to use the object. The user with the authorized encoder 20 should therefore be granted access to the motor vehicle only when in the immediate vicinity of the vehicle.

Figure 3:
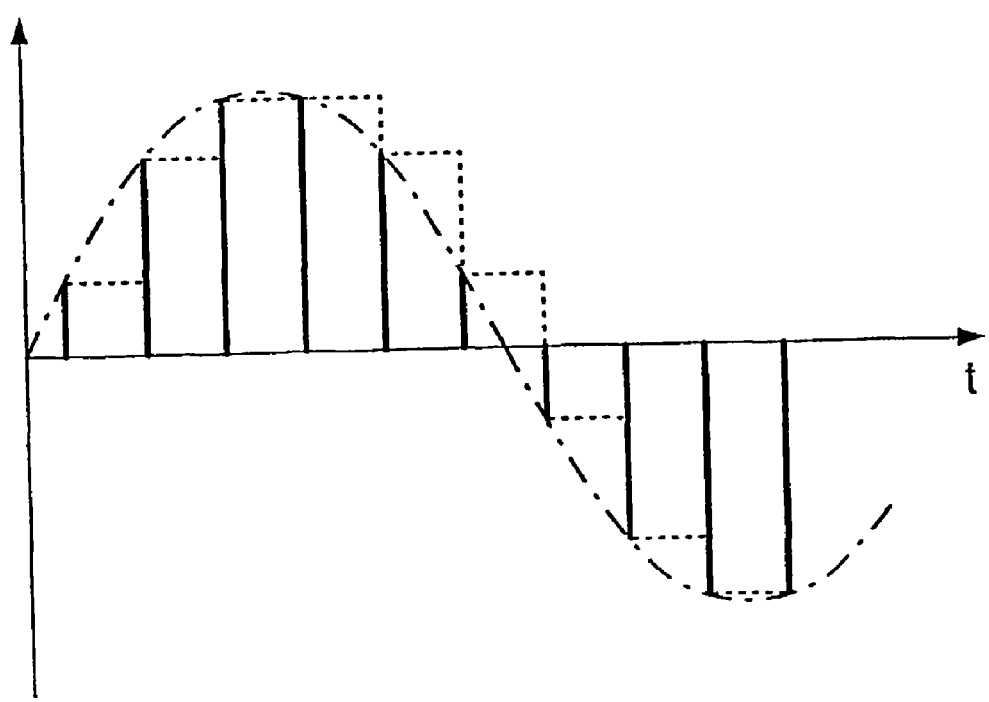
FIG. 3 shows a mixed signal which is produced as a hybrid product from the interrogation signal and a response signal.

In order to compare the decrypted response signal with the interrogation signal (i.e. generator signal), the two signals are mixed (multiplied). If, for example, a stair-step interrogation signal—as shown in FIG. 2—is transmitted and, following the decryption, such a signal is present at the input of the mixer 15, the result is a hybrid product consisting of a sum frequency component and a difference frequency component which is sampled. In other words, a sinusoidal signal is obtained, as represented by the envelope curve in FIG. 3. As a result of sampling by means of an A/D converter, time-discrete sampling values are obtained.

Figure 4:
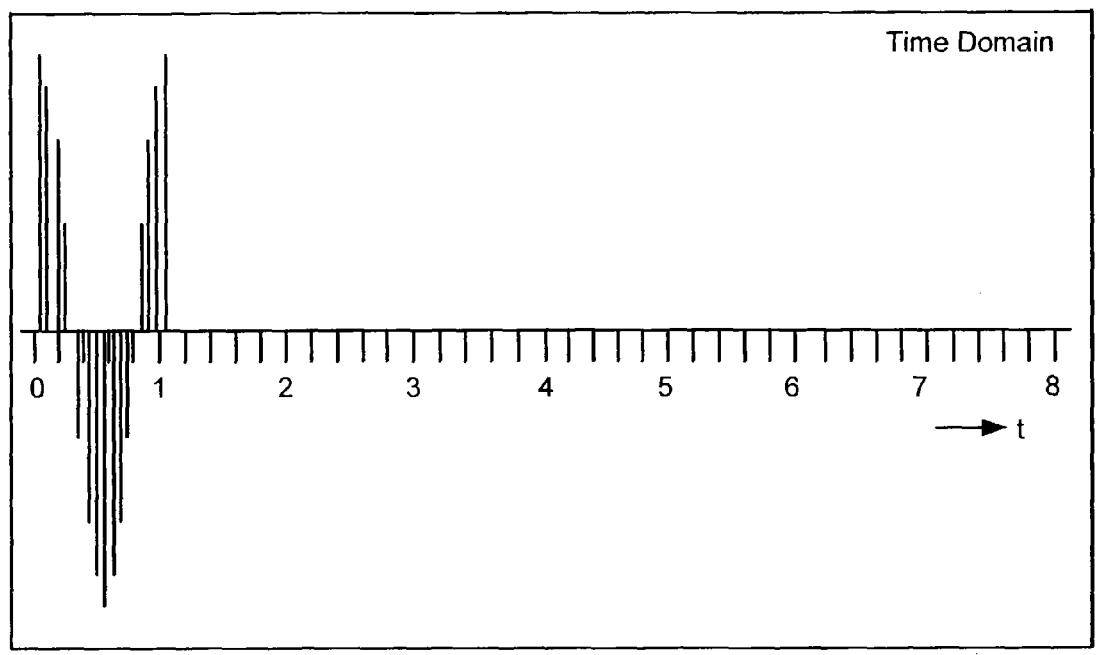
FIGS. 4 and 5 show signal representations of the mixed signal in the time and frequency domain
Figure 4:
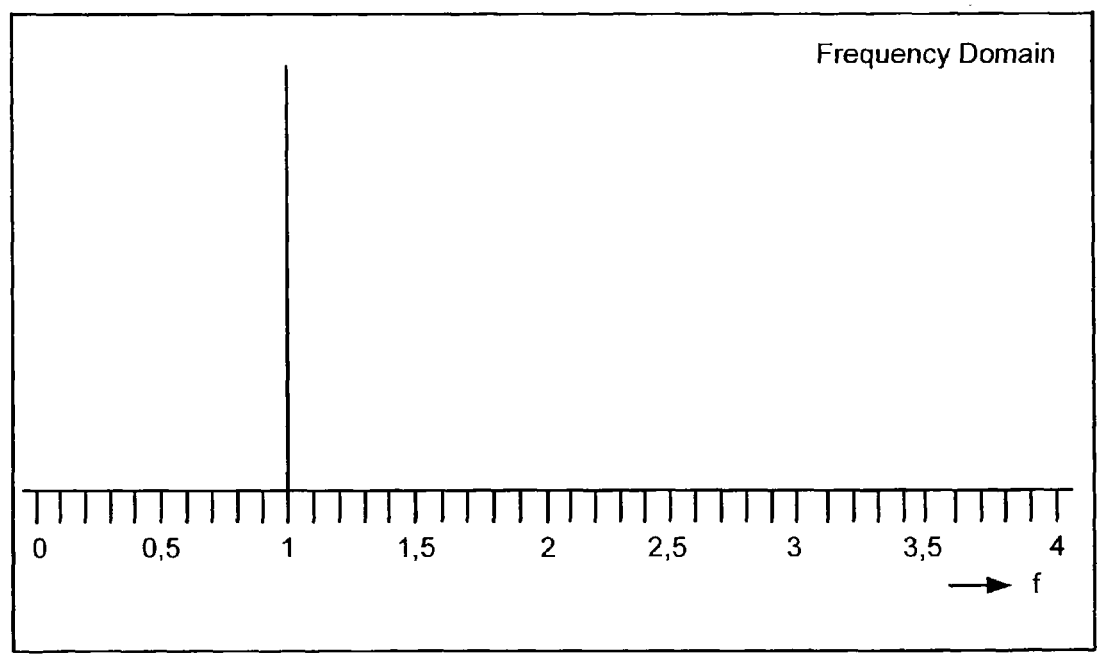

If a sinusoidal signal of this type is now transformed by means of a Fourier transformer 16 from the time domain into the frequency domain, this produces—as shown in FIG. 4—a Dirac function (also referred to as a δ function or δ pulse) whose frequency offset relative to the zero reference point is proportional to the basestation 10—encoder 20 distance.

The sequence of frequency stages is encrypted in the exemplary embodiment by means of stochastic steps using a secret random variable. The random variable is used synchronously both in the basestation 10 (during decryption) and in the encoder 20 (during encryption) with the result that in the basestation 10 there is again produced a signal sequence which, following the Fourier transform, generates a Dirac function corresponding to the distance, since the transform is performed using subsequently re-ordered values.

The random variable and therefore the encryption algorithm are stored protected against external readout both in the basestation 10 and also on the encoder 20.

If an encoder 20 which does not know the random sequence (random variable) were to be used, this would send back the response signal in an unordered or falsified sequence that is accessible to it. The Fourier transform would not produce a Dirac function, but a whole sequence thereof, as shown for example in FIG. 5, since the inverse random sequence is applied to the received response signal in the basestation 10. As soon as no unique Dirac function (but multiple frequency lines) is detected, the response signal is not accepted, even if the frequency line in the lower frequency domain would result in an appropriately short distance.

Initially the carrier frequency of the interrogation signal is modulated in such a way that the following series is produced:

$$f_{interrogation-signal} = f_0 + \text{random-variable} * \text{frequency step}$$

This is performed using n random values. Accordingly, an interrogation signal, for example, is transmitted corresponding to the function $$\cos(\omega_i * t) \quad (1)$$

where $\omega_i$=angular frequency and i=1, 2, . . . n. Following encryption (apply random variable to the transmitted function) or modification of the sequence on the encoder 20 and decryption (apply inverse random variable to the function) in the basestation 10, a signal is then obtained corresponding to the function:

$$\cos(\omega_i * (t - 2d/c)) \quad (2)$$

where d=distance between encoder 20 and basestation 10 and c=speed of light.

The two functions are multiplied with each other by the mixer 15, resulting in a signal corresponding to the function:

$$\cos(\omega_i * t) * \cos(\omega_i * (t - 2d/c)) = 1/2 * \cos(2\omega_i * d/c) + 1/2 * \quad (3)$$

where the term is $$(2\omega_i * d/c) = 2\omega_0 * d/c + i * \Delta\omega * 2d/c \quad (4)$$

where i=1 . . . n.

The term $$i * \Delta\omega * 2d/c \quad (5)$$

preferably corresponds to the period oscillation $2\pi$. This results in the bandwidth within which the carrier frequency is modified in stepwise fashion, to:

$$n * \Delta f = c/2d \quad (6)$$

If, for example, the distance d between encoder 20 and basestation 10 is assumed to be 30 m, the result yielded by formula (6) is a bandwidth of 5 MHz. Assuming, for example, n=16 sections for the carrier frequency, each section has the minimum bandwidth $\Delta f$=312 kHz. Sixteen values are then likewise taken for the Fourier transform.

It can be seen from this that the identification system is reasonably used only at higher frequencies, since the bandwidth otherwise becomes too large and then national radio approval regulations could be infringed. Conversely, however, a larger value can be chosen for the maximum permissible distance d in order to enable the identification system to be operated in a smaller frequency band.

If a distance d is unambiguously detected after the Fourier transform, then an authorization is present to enable access to the object (for example a computer, a motor vehicle, a telephone, an automated teller machine, a building, etc.) or to allow the object to be used.

To ensure that the code signal is not intercepted and reproduced in an unauthorized way, firstly a frequency-modulated signal is transmitted in sections, and secondly the sequence of the sections is encrypted on the encoder side and decrypted by means of the inverse algorithm on the object side. Thus, the interrogation signal is "reflected" in encrypted form. The distance d can be determined only if the response signal is decrypted correctly. If the distance d is then also less than a predefined value, access to or use of the object is enabled.

The basestation 10 must therefore be capable of measuring its signal propagation times (which correspond to distances). An additional effect of the distance measurement is that the changes in the signal propagation times, more particularly in the case of undesirable and impermissible lengthening of the signal propagation time, are immediately detected by the basestation 10 and consequently protection against unauthorized interception and reproduction is ensured.

As a result of the Fourier transform of the mixed signal it is possible in addition to implement an anticollision method for a plurality of encoders 20 assigned to the object. If there is only one authorized encoder 20 in the vicinity, the result, according to FIG. 4, is only a single spectral line in the frequency range, in this case, for example, at the normalized frequency "1". If there are multiple encoders 20 at different distances in the vicinity of the object, the result in each case is a spectral line for each encoder 20 at that normalized frequency that corresponds to its distance $d_i$ in each case.

Figure 5:
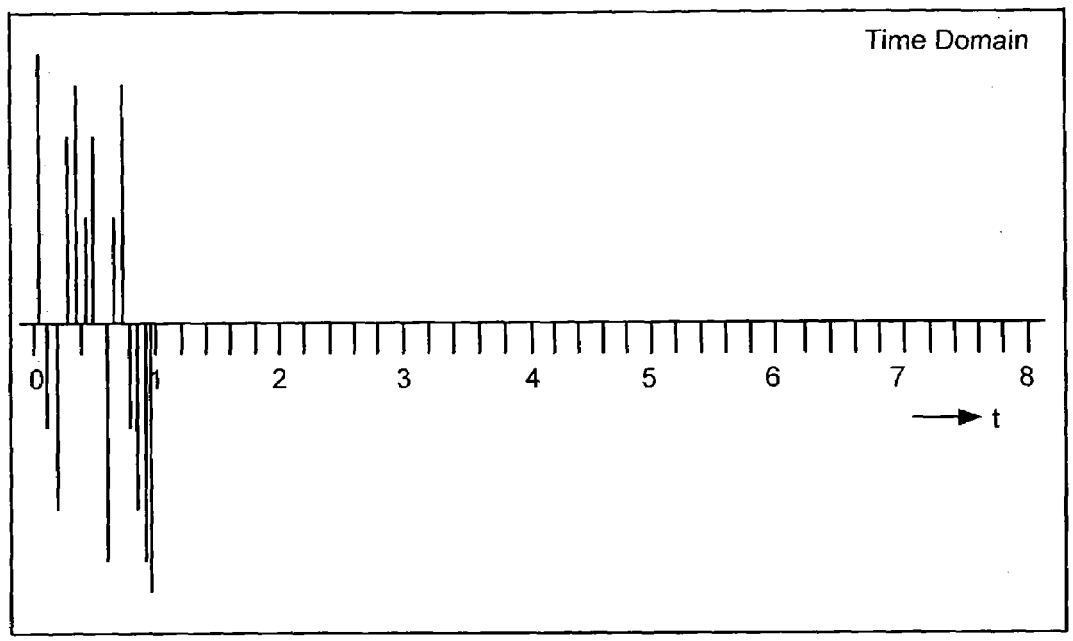
Figure 5:
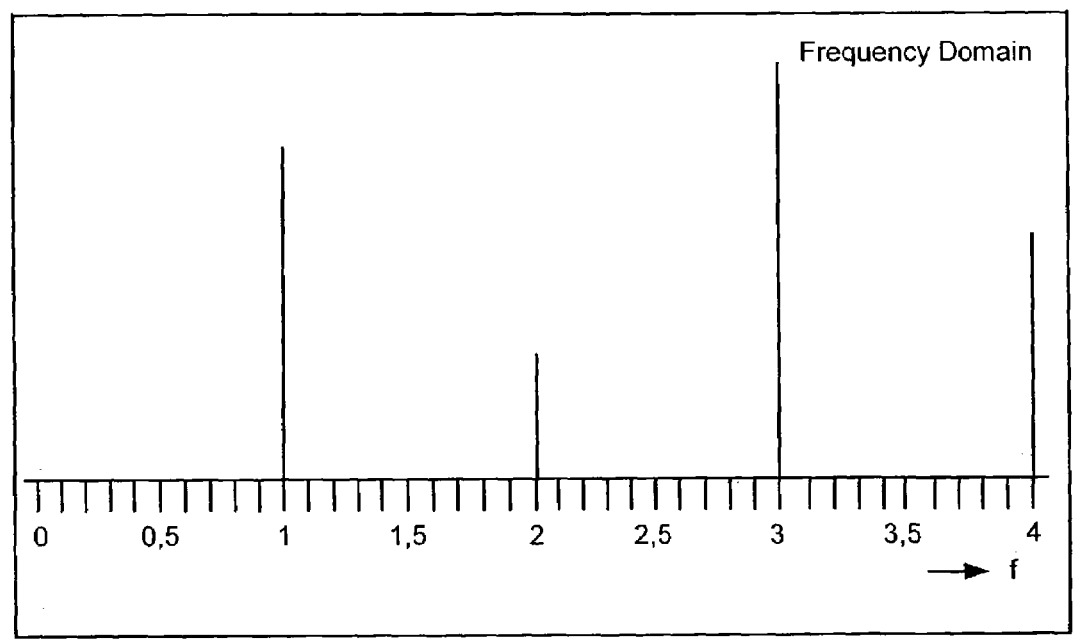

If, however, there is in the vicinity of the object an unauthorized encoder 20 which does not know the encryption secret, the result, as shown in FIG. 5, is many harmonic spectral lines of the basic frequency (integral multiples of the basic frequency). The amplitudes of the spectral lines decrease from a certain frequency. As a rule, however, there are many more spectral lines present than encoders 20 assigned to the object and furthermore the spectral lines are only ever to be encountered at the integral multiples of the basic frequency.

Since it is very unlikely that multiple authorized encoders 20 are located precisely at an integral distance from the nearest encoder 20, it can therefore be readily detected whether multiple authorized encoders 20 or at least one unauthorized encoder 20 are in proximity to the object. Consequently, multiple authorized encoders 20 may also well be present within the interrogation zone without a collision of the various response signals adversely affecting a validation of the authorization.

The identification system according to the invention is advantageously used in a motor vehicle 30 (FIG. 6) and is also explained in more detail for this application by way of example. However, it can also be used for other objects, such as computers, telephones, the Internet, automated teller machines, roads subject to a toll, means of transport (travel card), rooms, buildings, and so on.

Possible points of attachment for the send and receive unit 17 when used in a motor vehicle 30 are indicated in FIG. 6. Send and receive units 17 are preferably located in the driver door 31 (e.g. with two send and receive units 17, and in fact with an exterior antenna and an interior antenna) and/or the front passenger door 32. If rear passenger doors 33 are present, two send and receive units 17 can similarly be disposed in each of them. One send and receive unit 17 can be disposed next to the interior mirror 35, one in the rear window shelf 36 and one at the rear of the vehicle in the vicinity of the trunk 34.

When prompted (for example by actuation of a switch or door handle on the motor vehicle 30), or upon the approach of a person, the send and receive unit sends its interrogation signal either singly or repeatedly in a preferred direction. If the encoder 20 receives the interrogation signal, it sends back a response signal.

Access to the motor vehicle 30 is enabled only when it is unambiguously recognized that the encoder 20 is also actually close enough to the motor vehicle 30. Consequently, a signal can then be initiated to unlock the doors or release the immobilizer. If the encoder 20 approaches a door 31, 32, 33 or the trunk 34, provided authorization is verified, an unlock command and also additional commands, such as switch on interior lights, can be initiated if the encoder 20 is correctly recognized as being within the permitted distance d.

The point of attachment and the number of send and receive units 17 are a product of the vehicle geometry and the desired requirements in terms of detection range in which the encoder 20 should be situated and in terms of the convenience of carrying the encoder 20.

The response signal received by the send and receive unit 17 can be evaluated directly in the send and receive unit 17. In addition, each of the send and receive units 17 distributed throughout the vehicle can supply its received response signal to a central processing unit (not shown) in which the authorization is then verified.

Furthermore, depending on the number and location of the received response signals, the central processing unit can decide whether only driver door 31, passenger door 32, all doors 31–33 or only the trunk 34 are to be locked or unlocked. This is dependent on which of the send and receive units 17 distributed over the motor vehicle body was determined as being the shortest distance (shortest propagation time) from the encoder 20, i.e. from which direction the code signal came or from which direction the user approaches his/her vehicle.

This identification system provides additional protection against interception and reproduction of the response signal, since the encryption variable/encryption algorithm can change synchronously after each question-answer dialog either on the encoder 20 or in the object. A change in the encryption of this type is known and is also referred to as an alternating code or rolling code.

In the identification system according to the invention, all that takes place between the response signal and the interrogation signal is a pseudo-comparison, in which only the frequency offset between the two signals is relevant, not the code content of the signals. For this purpose the two signals are correlated with each other in the mixer. And a clear and unequivocal distance d results only if the random variables n are identical on both sides.

Figure 7:
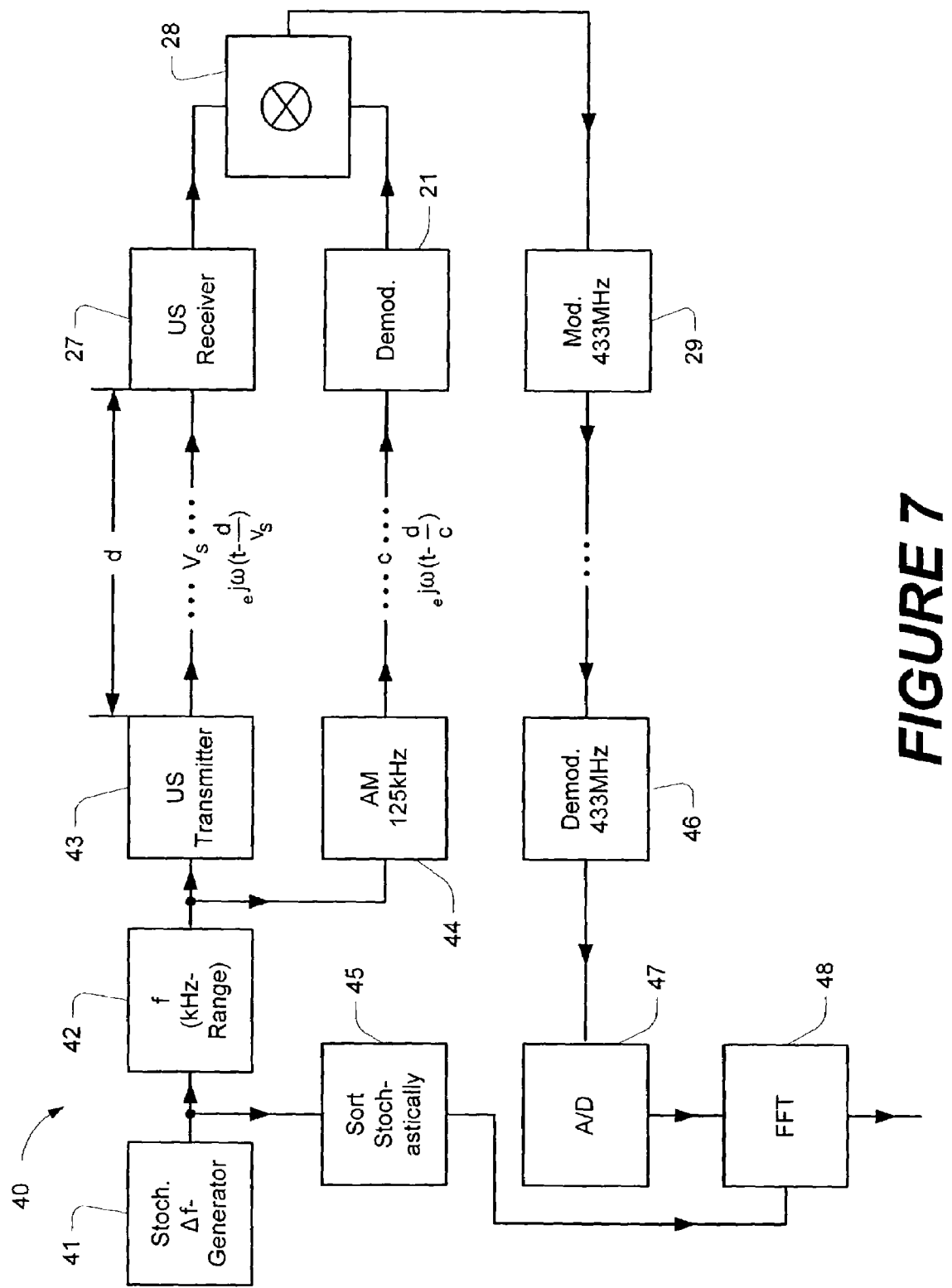
FIG. 7 shows a block diagram of a further exemplary embodiment of an identification system according to the invention.

In the further exemplary embodiment of the invention, two different interrogation signals (FIG. 7) can also be transmitted. In this case the first interrogation signal is transmitted with section-wise modified carrier frequency in the ultrasound frequency range (with the speed of sound $v_s$ as the speed of propagation) by means of US transmitter 43 and received on the encoder 20 by means of US receiver 27. The second interrogation signal is similarly transmitted in modulated form at a section-wise modified carrier frequency in a frequency range (in this case at about 125 kHz) by means of a transmitter 44 to the encoder 20 (with speed of light c as the speed of propagation) and is received and demodulated in the encoder 20 by a receive unit 21.

The two signals are correlated (mixed) with each other on the encoder 20 by means of a mixer 28 and sent back as a response signal in modulated form via a transmitter 29 at a fixed carrier frequency (in this case 433 MHz) to the object, where it is received and demodulated by a receiver 46.

In this exemplary embodiment advantage is taken of the different propagation speeds of the interrogation signals, which, following mixing and Fourier transform, enable a distance d to be clearly detected.

For this purpose, the interrogation signals are controlled by a stochastic step frequency generator 42 and a bandwidth generator 42 which specifies a section-wise modified carrier frequency according to a sequence (equivalent to an encryption or encoding). An "inverse" encryption is applied on the encoder side. To generate a reference signal, the same "inverse" encoding is applied as in the encoder 20 in order to reverse the encryption again.

On the encoder 20, the received and demodulated response signal is compared with the reference signal by means of a mixer 28. For this purpose, the output signals of the receivers 27, 21 are supplied to the mixer 28 and sent as a response signal to the object. There, following demodulation and sampling by means of an A/D converter 47, they are supplied to a Fourier transformer 48. The reference signal, which was produced from the generator signal and by decryption by means of a stochastic code generator 45, is likewise supplied to the Fourier transformer 48. With the aid of the then Fourier-transformed signal the authorization can be recognized based on the distance d of the encoder 20 from the object.

The invention has the advantage that the "cryptology" is included in the identification system and consequently greater security is achieved even though no comparison of the code information contained in the encrypted signals is carried out on the object side. If, however, the response signal or the interrogation signal is not present in encrypted form, no authorization can be recognized because the distance d cannot be determined.

This embodiment of the invention has the advantage that existing identification systems with distance detection can be converted retroactively. Conventional identification systems typically operate at low frequencies (125 kHz and 433 MHz), at which a distance determination by means of only one interrogation signal and the method according to the invention is only possible if large distances are permitted as authorized. In order to increase the security of the identification system only small distances should be permitted. In other words the user should be in immediate proximity to the object to be used in order to obtain access.

With the invention, either the sequence in which the carrier frequency is modified in sections is initially transferred to the encoder 20, encrypted there, transferred back and decrypted on the object side before the signal is Fourier-transformed. Alternatively, the encrypted sequence is transmitted on the object side, ordered into the "correct" sequence on the encoder side and sent back to the object. On the object side the reference signal is either encrypted or decrypted before it is compared with the received/demodulated response with regard to frequency offset.

The term "stochastic" in the context of the invention is to be understood as encryption or decryption by means of, for example, a mathematical algorithm and/or a random number generator.

The term "mixing" is to be understood as a conversion of one frequency into another frequency range by modulation by means of an auxiliary frequency. The process of mixing produces a sum frequency and a difference frequency. One of the frequencies can be filtered out by means of a filter and used for further evaluation. In this way two signals can be compared with regard to their frequencies/frequency offset by mixing.

The invention claimed is:

1. An identification system for verifying an authorization to access a motor vehicle, said system comprising:
   a send and receive unit disposed on the vehicle to transmit an interrogation signal with section-wise modified carrier frequency in modulated form according to a sequence,
   a mobile encoder to generate a response signal by sending back the received sequence in encrypted and modulated form, and an evaluation unit on the vehicle to decrypt the response signal and compare it with the interrogation signal with regard to a frequency offset and determine the distance between the encoder and the object as a function of the result of the comparison.

2. An identification system according to claim 1, wherein the evaluation unit is supplied with a mixed signal composed of an interrogation signal and a response signal and a hybrid product resulting in the process is evaluated with regard to distance.

3. An identification system according to claim 1, wherein the mobile encoder comprises a memory wherein the sequence of section-wise modified carrier frequencies is buffered and with the aid of which the response signal is encrypted.

4. An identification system according to claim 1, wherein the evaluation unit comprises a decryption unit to decrypt the received response signal with regard to the sequence of the section-wise modified carrier frequencies, and a decoding unit to mix the response signal with the interrogation signal and evaluate it with regard to the propagation time difference between the two and therefore, the distance between the encoder and the vehicle.

5. An identification system according to claim 1, wherein the interrogation signal is transmitted as a broadband signal modulated with section-wise modified carrier frequencies in the frequency range greater than 100 MHz.

6. An identification system according to claim 1, wherein the evaluation unit comprises a Fourier transformer with the aid of which the distance is determined.

7. An identification system for verifying an authorization to access a motor vehicle, said system comprising:
   a send and receive unit disposed on the vehicle which transmits a first interrogation signal with section-wise modified carrier frequency according to a sequence and a second interrogation signal in modulated form at a different carrier frequency,
   a mobile encoder to correlate the first and the second interrogation signal and send back a response signal, and
   an evaluation unit on the vehicle to compare the response signal together with an encoded reference signal with regard to a frequency offset and determine the distance between the encoder and the object as a function of the result of the comparison.

8. A method for verifying an authorization to access an object or to use a motor vehicle, said method comprising:
   transmitting an interrogation signal with section-wise modified carrier frequency in modulated form according to a sequence,
   generating a response signal by sending back the received sequence in encrypted and modulated form, and
   decrypting the response signal and comparing it with the interrogation signal with regard to a frequency offset and determining the distance between an encoder and vehicle as a function of the result of the comparison.

9. A method according to claim 8, further comprising providing a mixed signal composed of an interrogation signal and a response signal and evaluating a hybrid product resulting in the process with regard to distance.

10. A method according to claim 8, further comprising buffering the sequence of section-wise modified carrier frequencies and encrypting the response signal with the aid of said sequence.

11. A method according to claim 8, further comprising:
    decrypting the received response signal with regard to the sequence of the section-wise modified carrier frequencies,
    mixing the response signal with the interrogation signal, and
    evaluating the response signal with regard to the propagation time difference between the two and therefore, the distance between encoder and vehicle.

12. A method according to claim 8, further comprising transmitting the interrogation signal as a broadband signal modulated with section-wise modified carrier frequencies in the frequency range greater than 100 MHz.

13. A method according to claim 8, further comprising determining the distance by performing a Fourier transformation.

14. A Method for verifying an authorization to access a motor vehicle, said method comprising:
    transmitting a first interrogation signal with section-wise modified carrier frequency according to a sequence and a second interrogation signal in modulated form at a different carrier frequency,
    correlating the first and the second interrogation signal and sending back a response signal, and
    comparing the response signal together with an encoded reference signal with regard to a frequency offset and determining the distance between an encoder and the vehicle as a function of the result of the comparison.

* * * * *